Patented Jan. 13, 1942

2,270,204

UNITED STATES PATENT OFFICE 2,270,204

PROCESS OF PRODUCING OXIMES

Paul Schlack, Berlin-Treptow, Germany, assignor, by mesne assignments, to E. I. du Pont de Nemours and Company, Wilmington, Del.

No Drawing. Application November 27, 1939, Serial No. 306,430. In Germany November 28, 1938

4 Claims. (Cl. 260—566)

This invention relates to a process of producing oximes and more particularly to a continuous process of this kind.

Oximes are usually prepared by the reaction of aqueous hydroxylamine salts with a carbonyl compound in the presence of a neutralizing agent. Hitherto no proposals have been made regarding the large scale industrial production of such oximes.

It is therefore an object of this invention to provide a process for continuously producing oximes on an industrial scale. Further objects of the invention will appear from the following detailed description. I have found that oximes can be produced in an especially economical manner from aqueous hydroxylamine salt solutions by adding one of the components necessary to form the oxime of a carbonyl compound, that is, either a neutralizing agent or a hydroxylamine salt solution or both, to a carbonyl compound which flows through a cooled reaction vessel. The reaction vessel may be a closed tube or, if the vapor pressure of the carbonyl compound and of the oxime is only slight, it may be an open channel with propelling and mixing devices such as stirrers or endless screws. The carbonyl compound may flow through the tube or channel either in the dissolved, dispersed or liquid state. The neutralizing agent or the hydroxylamine salt solution is added gradually, for instance, through a perforated tube or through jets distributed along the length of the tube. The through-put should be such that the reaction mixture leaves the apparatus acid to litmus.

In this manner it is possible to carry out the reaction with very little loss of hydroxylamine and with moderate costs for the cooling. The reaction product can be taken off continuously by means of centrifuges or moving sucking filters, if it is in the solid state. If the reaction product is liquid, it is preferably taken up in a solvent suitable for further processing. This solvent can enter into the reaction mixture from the start together with the carbonyl compound. The addition of solvents like methylene chloride, n-butyl alcohol or chlorobenzene is necessary in those cases in which the carbonyl compound like d-menthone is practically water insoluble and solid during the reaction. It is to be recommended, however, that as little solvent as possible be employed with compounds insoluble in water, especially if the solvent itself is hydrophobic. In such cases the reaction may be greatly accelerated by strongly acting stirrers or by the addition of dispersing agents, for instance oleyl polyglycol.

Neutralization of the mixtures of carbonyl compounds with hydroxylamine salt solutions is carried out by gradual addition of an alkaline neutralizing agent. The reaction mixture is preferably kept acid during the entire reaction, so that resinification of sensitive carbonyl compounds, which must be expected especially in treating aldehydes with alkali, is completely prevented. At the end of the reaction the last parts of liberated mineral acids may be neutralized with buffer salts, for instance alkali-phosphates or alkali acetates. For the same reason provision must be made in the case in which the hydroxylamine salt solution and the neutralizing agent are added simultaneously, that the hydroxylamine salt solution is always added in surplus quantities calculated on the alkali, whereby the reaction is kept constantly acid. The speed with which the oxime-forming reaction occurs is generally small in the neighbourhood of a pH of 7.

Carbonyl compounds which are stable against alkali, for instance many saturated ketones, can be mixed at first with alkali, for instance sodium hydroxide, and introduced into the reaction vessel or tube and the formation of the oxime can be carried out in a medium which remains alkaline until shortly before the end of the reaction. At the end of the reaction, however, the mixture is acidified, preferably with a weak acid such as acetic acid. Instead of acetic acid phosphoric acid may be used.

All agents which act to neutralize acids may be employed for neutralizing, such as caustic alkalies, alkali carbonates, ammonia and amine bases, ammonium carbonate etc., as far as they yield water soluble salts with the anions of the hydroxylamine salts. The employment of bases which, like chalk, yield an insoluble reaction product by the reaction with hydroxylamine sulfate is also within the scope of the invention, if the oxime formed can be distilled from the reaction mixture with steam.

The hydroxylamine salt solution and the carbonyl compound are advantageously not employed in equivalent amounts. The best procedure is to work with a surplus of about 3 to about 15% of hydroxylamine salt.

The invention is illustrated by the following example:

A mixture of cyclohexanone and hydroxylamine sulfate solution, containing 170 g. of hydroxylamine per liter in the proportion of 1 mol.

of cyclohexanone of 98% purity to 1.05 mols of base is continuously led through a cylindrical tube, in which there is arranged a uniformly rotating propeller. The tube is surrounded by a cooling jacket. Through the wall of the tube aqueous ammonia of 30% strength is introduced through a row of fine jets. The addition of ammonia is so controlled that an acid reaction prevails in the system, decreasing from top to bottom. The now pulpy reaction mass flows into a continuously rotating centrifuge at the lower end of the tube. The filtrate together with the washing liquid is led into a collecting vessel in which 0.1 mol of ketone calculated on 1 mol of the original amount of ketone is added. The mixture is again neutralized until it has a pH of about 4 and the mixture consisting of cyclohexanol, cyclohexanone and cyclohexanoneoxime is steam distilled for recovery. The aqueous mother liquor remaining is worked up for fertilizer salt. The yield of oxime obtained directly is 95%–97% of the theoretical calculated on the ketone used.

I claim:

1. A process for the continuous production of an oxime from a cycloalkanone and an aqueous solution of a mineral acid salt of hydroxylamine and a substance whose solutions are basic in reaction, which comprises gradually adding one of the reaction components other than the cycloalkanone to a liquid containing the cycloalkanone flowing continuously through a reaction vessel.

2. A process for the continuous production of an oxime which comprises leading an aqueous solution of a mineral acid salt of hydroxylamine together with a cycloalkanone through a cooled reaction tube and gradually introducing aqueous alkali sufficient to bring the pH of the mixture to about 4.

3. The process in accordance with claim 2 characterized in that the cycloalkanone is cyclohexanone.

4. A process for the continuous production of an oxime, which comprises passing an aqueous mixture of cyclohexanone and hydroxylamine sulfate in turbulent flow through a cooled reaction vessel into which ammonium hydroxide is injected at such a rate that the reaction mixture remains acid, the acidity decreasing as the mixture proceeds through the reaction tube, separating the pulp from the liquid, adding cyclohexanone to the liquid, and neutralizing the said liquid to a pH of 4.

PAUL SCHLACK.